J. RAU.
DASH POT FOR GLASS BLOWING MACHINES.
APPLICATION FILED OCT. 6, 1911.
1,107,446.
Patented Aug. 18, 1914.
2 SHEETS—SHEET 1.
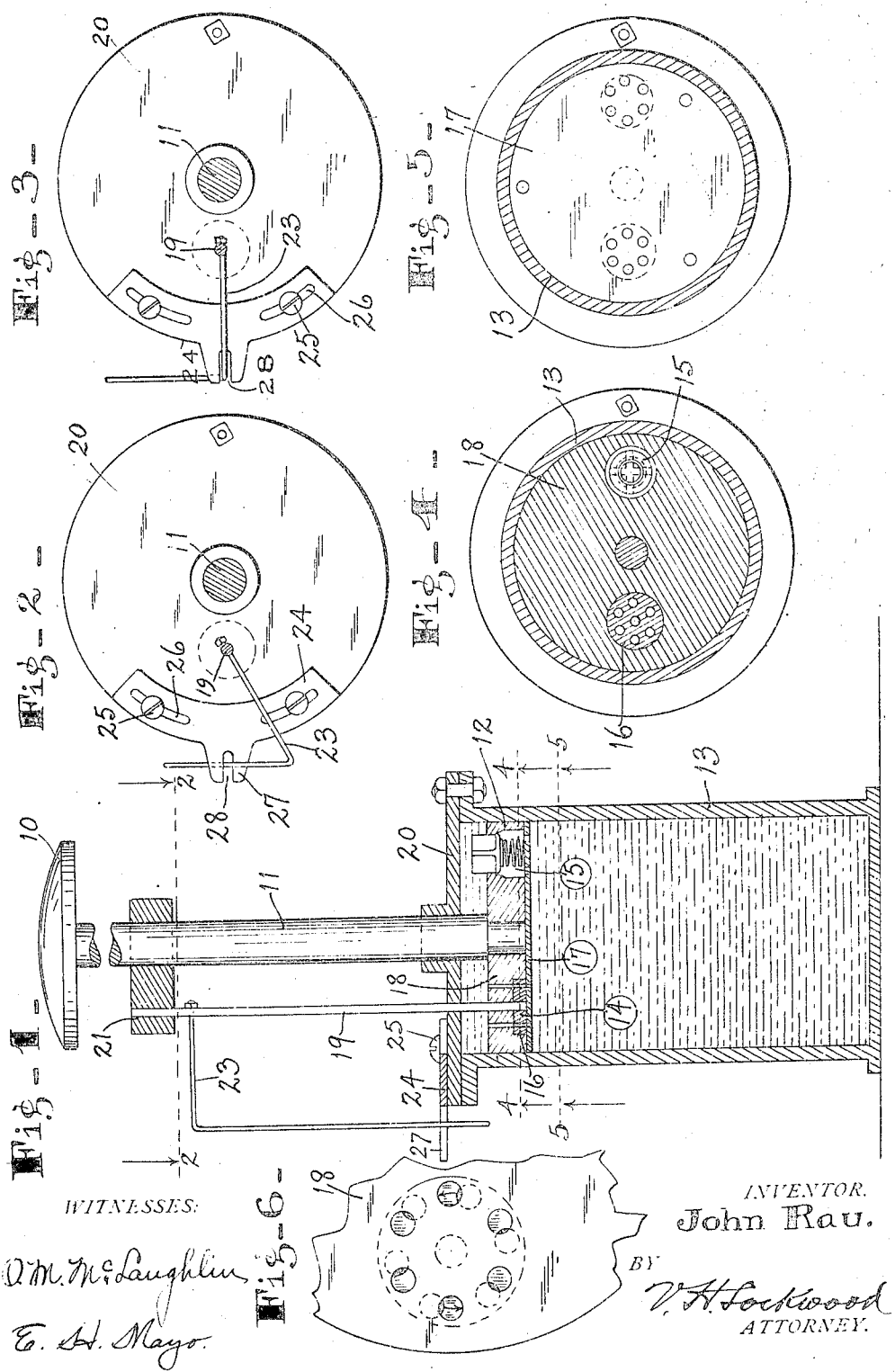
WITNESSES:
O. M. McLaughlin
E. H. Mayo
INVENTOR.
John Rau.
BY
V. H. Lockwood
ATTORNEY.

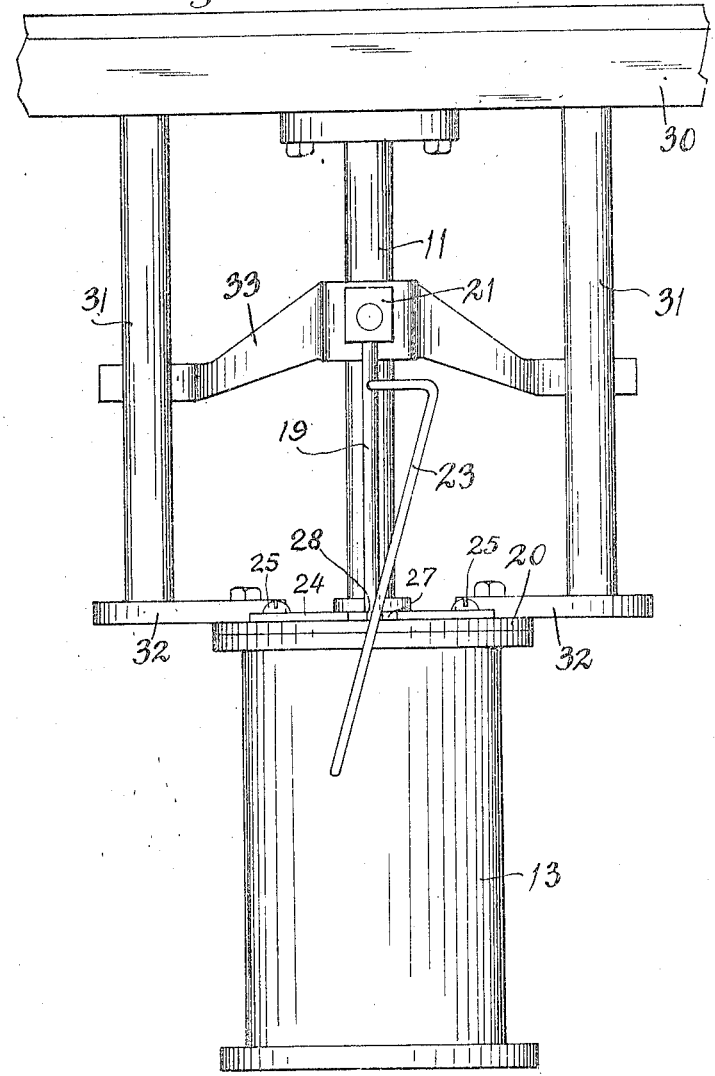

UNITED STATES PATENT OFFICE.

JOHN RAU, OF INDIANAPOLIS, INDIANA.

DASH-POT FOR GLASS-BLOWING MACHINES.

1,107,446.     Specification of Letters Patent.     Patented Aug. 18, 1914.

Application filed October 6, 1911. Serial No. 653,192.

*To all whom it may concern:*

Be it known that I, JOHN RAU, of Indianapolis, county of Marion, and State of Indiana, have invented a certain useful Dash-Pot for Glass-Blowing Machines; and I do hereby declare that the following is a full, clear, and exact description thereof, reference being had to the accompanying drawings.

The object of this invention is to provide an improved means for controlling the descending movement of a movable mold bottom in glass blowing machines.

The chief feature of the invention consists in providing means for yieldingly supporting and resisting the downward movement of the movable mold bottom, combined with means for accelerating the descending movement thereof as the blowing of the article proceeds.

The nature of the invention will be understood from the accompanying drawings and the following description and claims.

In the drawings, Figure 1 is a central vertical section through a portion of the glass blowing machine, showing the movable bottom and the controlling means in an elevated position. Fig. 2 is a horizontal section on the line 2—2 of Fig. 1. Fig. 3 is the same as Fig. 2 with the valve controlling means in an altered position. Fig. 4 is a horizontal transverse section on the line 4—4 of Fig. 1. Fig. 5 is a horizontal transverse section on the line 5—5 of Fig. 1. Fig. 6 is an enlarged view of the lower end of the valve shown in Fig. 5, showing the port openings therethrough when the piston is raised to its highest position. Fig. 7 is a front elevation of a portion of the blow mold table, and the means for controlling the movement of the mold bottom.

This invention is used in machines for blowing hollow glass ware wherein the bottom of the mold is movable, being elevated after the blank has been introduced in the blow mold and before the blowing process has been started and yielding downwardly as the blowing process progresses.

In detail there is shown in the drawings the lower portion of a glass blowing machine having a movable blow mold bottom 10 mounted on the piston rod 11 which has a piston 12 on its lower end having vertical movement in a closed cylinder 13 filled with a viscous liquid, said piston having a rotary valve 14 and a spring pressed vertical lift valve 15 mounted therein.

The valve 14 is mounted within the piston 12 and consists of a plate 16 through which there are drilled a series of holes which mate with corresponding holes through the bottom plate 17 of the piston 12 and with a similar series of holes through the upper portion 18 of said piston. Said valve 16 is mounted upon a rod 19 which extends upward through the piston and through the cylinder cover 20 and the upper end has bearing within a collar 21 secured on the rod 11. A rod 23 is secured to said rod 19 and projects outward at right angles therefrom beyond the rim of the cylinder cover 20 where it is bent downward and to one side to form an angle of approximately thirty degrees with the vertical, as indicated in Fig. 2.

There is a guide 24 adjustably secured to the cylinder cover 20 by screws 25 within the arched slots 26 and having a slotted outward portion 27 thereon which projects beyond the edge of said cover 20. The inclined portion on the rod 23 lies within said slot 28 on the projection 27 and with the guide member 24 secured in position as the mold bottom descends, the rod 23 moving through said slot, will cause the rod 19 to be oscillated through a small angle which moves the ports in the valve 16 into registry with the ports through the plates 17 and 18 of the piston. The check valve 15 is opened by the liquid in the cylinder 13 as the piston 12 is moved upward and allows the free passage of said liquid from the upper side of the piston to the lower side thereof, but will close upon a downward movement and not permit a passage therethrough.

With the guide 24 so positioned with regards the operating rod 23 on the valve rod 19 and the ports in the valve 16 substantially in the position shown in Fig. 6, it will readily be understood that as the blowing process proceeds, the pressure on the mold bottom 10 will cause it to yield or descend which will move the inclined portion of the operating rod 23 within the slot 28 on the guide 24 and cause an opening movement of the valve 16, which opening is increased as said mold bottom and piston descend, thus allowing a more rapid descent of the parts as the article being blown nears completion.

The cylinder 13 is supported from the blow mold table 30 through which the piston 11 extends and reciprocates vertically by rods 31 and ears 32, the latter being secured to the top of the cover 20 of the cylinder 13. The piston rod 11, collar 21, rods 19 and 23 are prevented from oscillating or getting out of place angularly by bars 33 projecting laterally from opposite sides of the collar 21 and rod 11, and bear against and engage the rear surface of the rods 31. Without this guiding means the rod 23 would fail to perform its function satisfactorily, as there would be nothing to prevent some oscillatory movement of the parts as they move downwardly and upwardly.

I claim as my invention:

1. In a glass blowing machine, a dash pot construction including a rod, a piston on said rod with a port therethrough, a fluid containing cylinder for said piston, a valve in said piston to control said port, and means controlled by the movement of the piston for gradually opening said valve whereby the lowering movement of the piston will be accelerated during its progress.

2. In a glass blowing machine, a dash pot construction including a rod, a piston on said rod with a port therethrough, a fluid containing cylinder for said piston for controlling the port in said piston, a valve stem extending upwardly beyond the cylinder and connected with said rod, and means for gradually oscillating said valve stem as the piston descends.

3. In a glass blowing machine, a dash pot construction including a rod, a piston on said rod with a port therethrough, a fluid containing cylinder for said piston, a rotary valve for controlling the port in the piston, a valve stem extending upwardly beyond the cylinder and rotatably mounted in connection with said rod, a bent arm secured to said valve stem with a downward portion inclined from a vertical line, and a guide connected with said cylinder through which the lower part of said bent arm moves, whereby as the valve stem moves downwardly said guide will oscillate said arm and valve stem for opening the valve.

4. In a glass blowing machine, a dash pot construction including a rod, a piston on said rod with a port therethrough, a fluid containing cylinder for said piston, a rotary valve for controlling the port in the piston, a valve stem extending upwardly beyond the cylinder and rotatably mounted in connection with said rod, a bent arm secured to said valve stem with a downward portion inclined from a vertical line, a guide connected with said cylinder through which the lower part of said bent arm moves, whereby as the valve stem moves downwardly said guide will oscillate said arm and valve stem for opening the valve, and means for adjusting said guide concentrically with the cylinder.

5. In a glass blowing machine, a dash pot construction including a rod, a piston on said rod with a port therethrough, a fluid containing cylinder for said piston, a rotary valve for controlling the port in the piston, a valve stem extending upwardly beyond the cylinder and rotatably mounted in connection with said rod, a bent arm secured to said valve stem with a downward portion inclined from a vertical line, a guide connected with said cylinder through which the lower part of said bent arm moves, whereby as the valve stem moves downwardly said guide will oscillate said arm and valve stem for opening the valve, and means for preventing lateral movement of the upper end of said valve stem.

6. In a glass blowing machine, a fluid containing cylinder, a piston therein with a port therethrough, a piston rod projecting upwardly from the piston, a valve for regulating said port in the piston, means for preventing the piston rod from turning, a rod extending from said valve and oscillatably mounted in connection with said piston rod, and an inclined rod connected with said valve rod and projecting through a fixed guide secured to said cylinder, whereby as the piston rod operates said inclined rod and valve rod will cause the operation of the valve.

7. In a glass blowing machine, a table, a rod vertically movable therethrough, a piston on said rod, a fluid containing cylinder for said piston, a pair of fixed rods secured to and extending down from said table, one on each side of said piston rod and supporting said cylinder at its lower ends, and means between the table and cylinder movable with said piston rod and guided by said cylinder supporting rods for preventing said piston rod from turning.

8. In a glass blowing machine, a table, a rod vertically movable therethrough, a piston on said rod, a fluid containing cylinder for said piston, a pair of fixed rods secured to and extending downward from said table, one on each side of said piston rod and supporting the cylinder at its lower ends, and an arm secured to said piston rod between the table and cylinder and extending laterally in opposite directions in actuating engagement with said cylinder supporting rods.

9. In a glass blowing machine, a table, a rod vertically movable therethrough, a piston on the rod with a port therethrough, a fluid containing cylinder for said piston, a fixed rod on each side of said piston rod and extending down from said table and supporting said cylinders on their lower ends, a valve for controlling the port in the piston, arms extending laterally from said piston rod in engagement with said fixed rods to prevent the oscillation of the piston rod, and means carried by said arms and movable vertically with said piston rod for actuating and controlling said valve.

10. In a glass blowing machine, a table, a rod vertically movable through said table, a piston on said rod with a port therethrough, a fluid containing cylinder for said piston, a rod on each side of said piston rod which extends down from said table and is rigidly connected with the table and cylinder for supporting the latter, a rotary valve for controlling the port in the piston, a collar secured to the piston rod above the cylinder, a valve stem extending upwardly beyond the cylinder and rotatably carried in said collar, a bent arm secured to said valve stem with a downward portion inclined from a vertical line, a guide connected with the top of said cylinder and through which the lower part of said bent arm reciprocates, and guide arms extending laterally from the collar on the mold bottom supporting rod in engagement with the rods which support the cylinder to prevent oscillation of said collar.

In witness whereof, I have hereunto affixed my signature in the presence of the witnesses herein named.

JOHN RAU.

Witnesses:
E. H. MAYO,
O. M. McLAUGHLIN.